(12) United States Patent
Rasmussen et al.

(10) Patent No.: US 10,198,784 B2
(45) Date of Patent: Feb. 5, 2019

(54) CAPTURING COMMANDS IN A MULTI-ENGINE GRAPHICS PROCESSING UNIT

(71) Applicant: Microsoft Technology Licensing, LLC, Redmond, WA (US)

(72) Inventors: Brian Bo Rasmussen, Sammamish, WA (US); Cole Brooking, Woodinville, WA (US); Ivan Nevraev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 15/224,152

(22) Filed: Jul. 29, 2016

(65) Prior Publication Data

US 2018/0033115 A1 Feb. 1, 2018

(51) Int. Cl.
- *G06T 1/20* (2006.01)
- *G06T 1/60* (2006.01)
- *G06F 11/36* (2006.01)
- *G06F 9/52* (2006.01)

(52) U.S. Cl.
CPC .................. *G06T 1/20* (2013.01); *G06F 9/52* (2013.01); *G06F 11/3632* (2013.01); *G06F 11/3636* (2013.01); *G06T 1/60* (2013.01); *G06T 2200/28* (2013.01)

(58) Field of Classification Search
None
See application file for complete search history.

(56) References Cited

U.S. PATENT DOCUMENTS

| 6,208,361 B1 | 3/2001 | Gossett |
| 7,421,694 B2 | 9/2008 | Gosalia et al. |
| 7,755,632 B2 | 7/2010 | Brothers et al. |

(Continued)

OTHER PUBLICATIONS

"International Search Report and Written Opinion Issued in PCT Application No. PCT/US2017/041807", dated Oct. 11, 2017, 17 Pages.

(Continued)

*Primary Examiner* — Ryan McCulley
(74) *Attorney, Agent, or Firm* — Newport IP, LLC; Jacob P. Rohwer

(57) ABSTRACT

The techniques and systems described herein are directed to capturing commands in a multi-engine graphics processing unit (GPU). Captured commands can be played back by a developer to optimize software, hardware, and drivers. To accurately capture commands and memory associated with the commands during execution, dependencies between command buffer segments associated with the various GPU engines may be determined and used to divide a command buffer segment into atomic elements (which may also be referred to as seglets). Command buffer segments are analyzed to identify synchronization commands, which may represent a point in a command buffer segment that relies on an operation to be completed in another command buffer segment. The command buffer segment can be recursively divided into seglets based on the synchronization commands. The resulting seglets represent command segments that, upon execution, operate without synchronization interference from other command buffer segments.

19 Claims, 7 Drawing Sheets

(56) References Cited

U.S. PATENT DOCUMENTS

| | | | |
|---|---|---|---|
| 7,950,003 B1* | 5/2011 | Duca | G06F 8/20 |
| | | | 717/124 |
| 7,958,497 B1* | 6/2011 | Lindo | G06F 11/3636 |
| | | | 714/799 |
| 9,064,437 B2 | 6/2015 | Nalluri et al. | |
| 2007/0070669 A1 | 3/2007 | Tsern | |
| 2007/0250820 A1* | 10/2007 | Edwards | G06F 11/3636 |
| | | | 717/131 |
| 2010/0211933 A1* | 8/2010 | Kiel | G06F 11/3636 |
| | | | 717/125 |
| 2013/0162658 A1 | 6/2013 | Truong | |
| 2013/0162661 A1 | 6/2013 | Bolz et al. | |
| 2014/0095759 A1* | 4/2014 | Garlick | G06F 9/3877 |
| | | | 710/308 |
| 2014/0184624 A1* | 7/2014 | Roy | G06T 15/005 |
| | | | 345/522 |
| 2014/0372990 A1 | 12/2014 | Strauss | |
| 2015/0070369 A1 | 3/2015 | Frascati et al. | |
| 2016/0179714 A1* | 6/2016 | Acharya | G06F 12/023 |
| | | | 711/158 |
| 2017/0039124 A1* | 2/2017 | Kiel | G06F 11/362 |

OTHER PUBLICATIONS

Pena, et al., "VOCL-FT: Introducing Techniques for Efficient Soft Error Coprocessor Recovery", In Proceedings of the International Conference for High Performance Computing, Networking, Storage and Analysis, Nov. 15, 2015, 12 Pages.

Kim, et al., "A Distributed OpenCL Framework Using Redundant Computation and Data Replication", In Proceedings of the 37th ACM Association for Computing Machinery's Special Interest Group Conference on Programming Language Design and Implementation, Jun. 2, 2016, pp. 553-569.

Grasso, et al., "A Uniform Approach for Programming Distributed Heterogeneous Computing Systems", In Journal of Parallel and Distributed Computing Archive, vol. 74, Issue 12, Aug. 26, 2014, pp. 3228-3239.

Lee, et al., "An OpenCL Framework for Heterogeneous Multicores with Local Memory", In Proceedings of the 19th International Conference on Parallel Architectures and Compilation Techniques (PACT), Sep. 11, 2010, pp. 193-204.

Hower, et al., "Two Hardware-Based Approaches for Deterministic Multiprocessor Replay", In Communications of the ACM, vol. 52, Issue 6, Jun. 1, 2009, pp. 93-100.

Kim, et al., "SnuCL : An OpenCL Framework for Heterogeneous CPU/GPU Clusters", In Proceedings of the 26th ACM International Conference on Supercomputing, Jun. 25, 2012, pp. 341-351.

"What Mantle does", Published on: Nov. 29, 2013 Available at: http://techreport.com/review/25683/delving-deeper-into-amd-mantle-api/2.

"Synchronization and Multi-Engine", Retrieved on: May 23, 2016 Available at: https://msdn.microsoft.com/en-us/library/windows/desktop/dn899217(v=vs.85).aspx.

"A trip through the Graphics Pipeline 2011, part 2", Published on: Jul. 2, 2011 Available at: https://fgiesen.wordpress.com/2011/07/02/a-trip-through-the-graphics-pipeline-2011-part-2/.

* cited by examiner

CAPTURING COMMANDS IN A MULTI-ENGINE GRAPHICS PROCESSING UNIT

BACKGROUND

Traditional graphics processing units (GPUs) execute commands to render graphics for computing devices, such as a gaming console. Commands can be placed into a command buffer and can be executed by the GPU to perform various tasks, such as presenting data for display. In order to monitor the performance of a GPU, commands for the GPU can be captured and analyzed, along with a state of memory associated with the commands. Traditionally, commands associated with a single-engine GPU have been captured and analyzed in a linear sequence corresponding to the insertion of the commands into the command buffer. However, commands for a multi-engine GPU may include dependencies between command buffers, potentially leading to invalid results when capturing and analyzing commands.

SUMMARY

The techniques and systems described herein enable the capture of commands in a multi-engine graphics processing unit (GPU). In some instances, the capturing of commands may allow a video game developer to play back the operations of the GPU to analyze and optimize the operations of the GPU to improve performance of a video game title. To accurately capture commands and a state of memory associated with the commands during execution, dependencies between command buffer segments associated with the various GPU engines may be determined to recursively divide a command buffer segment into atomic elements (which may also be referred to as seglets).

For example, during capture, command buffer segments are analyzed to identify at least one synchronization command (e.g., a synchronization indication), which may represent a point in a command buffer segment that relies on an operation to be completed in another command buffer segment. The command buffer segment including the synchronization command can be divided into a first part and a second part, the first part spanning (e.g., including) the start of the command buffer segment until the point just before the synchronization command, and the second part including (e.g., spanning) the synchronization command until the end of the command buffer segment (or until a next synchronization command). Thus, the dividing operation can be performed recursively to generate seglets until reaching an end of the command buffer segment. The resulting seglets represent command segments that, upon execution, operate without synchronization (or other interference) from other command buffer segments. That is, each seglet can be atomically executed after an initial wait requirement is satisfied (corresponding to a synchronization command), memory requirements of each seglet can be determined, and memory associated with each seglet can be captured before, during, and/or after seglet execution, without the risk of other engines of the multi-engine GPU modifying the memory and invalidating the analysis. Thus, for each of the resulting seglets, the required memory is captured, establishing the proper memory state for the playback of the seglets.

The capture of commands in a multi-engine GPU allows designers to optimize the performance of a software title operating on a hardware platform, thereby improving a functioning of a computing device. For example, capturing commands allows designers to understand the relationship between commands in the multi-engine GPU, and to determine when command buffer segments are waiting for operations of other command buffer segments to be completed. Such waiting may represent unused capacity of the GPU, and determining an unused capacity of one or more engines in the GPU allows designers to revise operations to use a more complete capacity of hardware. Further, decomposing command buffer segments into atomic seglets allows an accurate state of memory to be determined. Improving GPU performance can improve a visual aspect of software, such as a video game title operating on a gaming console.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
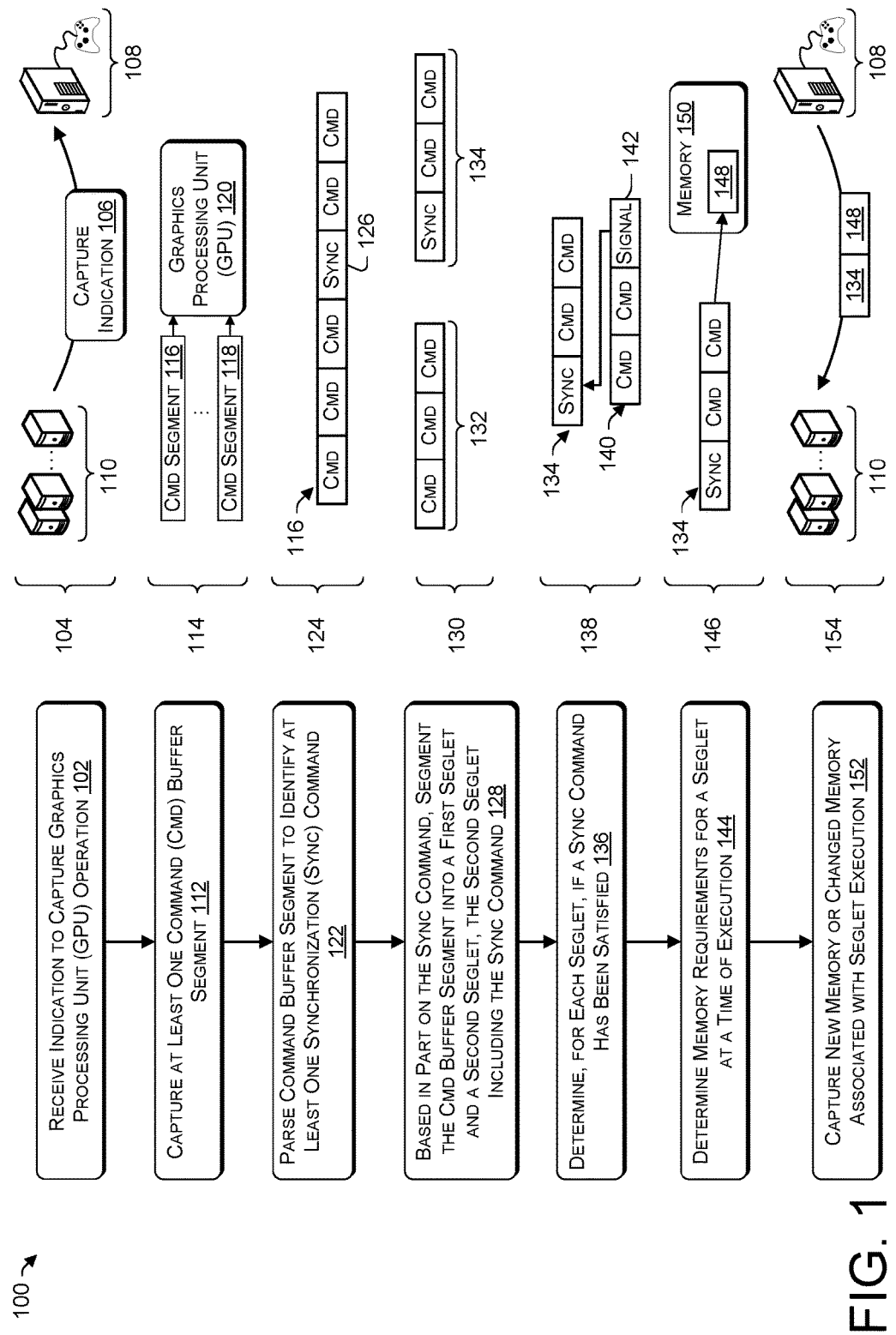
FIG. 1 illustrates a pictorial flow diagram of an example process for capturing commands in a multi-engine graphics processing unit (GPU).

The techniques and systems described herein enable the capture and playback of commands in a multi-engine graphics processing unit (GPU). In some instances, the capture and playback of commands can be used to analyze the performance of a software title, such as a video game, operating on a computing device, such as a video game console.

During development and troubleshooting of a software title, software developers often seek to optimize the performance of the software title. In the context of video game development, video game performance is often characterized by a number of frames per second (FPS), which is inversely proportional to an amount of time for processing a frame for display. For example, a software title displaying 80 frames per second typically displays a frame every 12.5 millisecond (ms).

Modern GPUs use multiple engines, often in parallel, to increase an amount of GPU processing to provide a high frame rate for software titles. For example, a multi-engine GPU may include one or more graphics engines, one or more compute engines, and one or more memory access engines, which process commands to render graphics on a display. Application program interface (API) calls from a software title can be received by a driver and can be interpreted by the driver to generate command buffer segments to be executed by the various engines of the multi-engine GPU. In some instances, the engines of the multi-engine GPU work together to render frames for display. That is, in some instances, dependencies exist between command buffer segments in the GPU engines, such that work must be completed in one engine before a command buffer segment in another engine can be executed. For example, synchronization commands within a command buffer segment may indicate that the command buffer segment is not to begin execution until work is performed by another engine of the GPU and a signal is provided satisfying the synchronization command.

Command buffer segments can include zero, one, or more synchronization commands to control execution of work, one or more commands to perform work, and/or zero, one or more signals to indicate when work is complete. As mentioned above, in some instances, commands in a command buffer segment may not be executed until a signal that satisfies a synchronization command is received. In some instances, a command buffer segment may refer to all commands associated with rendering a single frame and associated with a single engine in the multi-engine GPU. In one non-limiting example, in a GPU comprising a graphics engine, a compute engine, and a memory access engine, each engine can execute a command buffer segment to collectively render a frame on a display.

In order to play back the operation of the GPU for subsequent analysis, the commands of the GPU can be captured, along with a state of the memory associated with each command buffer segment. In order to accurately capture the state of the memory in this multi-engine GPU, the command buffer segments can be decomposed into atomic elements that disentangle the dependencies (e.g., the synchronization command or execution preconditions) between the various command buffer segments associated with different GPU engines.

Upon receiving a command or an indication to initiate a capture of commands in the multi-engine GPU, a capture module in a driver of a computing device can capture the command buffer segment(s) associated with a particular GPU engine. The capture module can parse the command buffer segment(s) to identify a synchronization command, and can recursively split the command buffer segment(s) into seglets, each seglet comprising at most a single synchronization command. In some instance, seglets that do not include a synchronization command can be associated with an execution list to be executed at an appropriate time by an intended GPU engine. In some instances, seglets including an unsatisfied synchronization command can be associated with a pending list, and when a signal is received satisfying the synchronization command, the seglet can be moved to the execution list to be executed by an intended GPU engine.

Memory associated with a seglet can be captured for subsequent playback, in accordance with embodiments of the disclosure. Prior to executing a seglet, the capture module can determine locations in a working memory that are accessed (e.g., written to, read from, or otherwise accessed or referred to) by the seglet. A state of the memory associated with the seglet can be stored prior to executing the seglet and can be updated with changes after executing the seglet. In some instances, a state of memory associated with a seglet is determined at a time of execution of the seglet (e.g., when any synchronization command is satisfied) to ensure a valid state of the memory is captured (e.g., without post-capture memory changes made by other commands). In order to minimize an amount of memory to be captured, the capture module can determine if the memory associated with the seglet has been previously captured, and/or can determine a subset of memory that has been changed, for example, to capture a change in the state of the memory.

In some instances, the driver, the capture module, and the GPU are included in a computing device, such as a video game console. In some instances, a capture indication is received from a service provider instructing the video game console to capture commands associated with presenting one or more frames of a video game title. After determining seglets from the command buffer segments and memory associated with each seglet, the seglets and the associated memory is captured and can be stored in a playback file and transmitted to the service provider for analysis. The playback file can be used to play back each seglet associated with the GPU, and/or can be analyzed to determine an occupancy (e.g., utilization) of each engine in the multi-engine GPU. In some instances, an occupancy of 50% may indicate that an engine is executing commands half of the time and is not executing commands the other half of the time. In some instances, the occupancy of the engine can be due to excessive waiting (e.g., because a seglet is waiting for a signal to satisfy a synchronization command), which may signal to a designer that some aspect of the commands can be optimized to improve the performance of the GPU associated with the video game console.

Thus, the techniques and systems described herein can improve a functioning of a computing device by capturing commands in a multi-engine GPU for analysis and playback. In some instances, identifying memory requirements of a seglet may reduce an amount of memory to be captured and transmitted to another device for subsequent playback and analysis. In some instances, an occupancy of an engine of the GPU can be identified to optimize an amount of work performed by a GPU engine, ultimately resulting in an increase in frames per second presented by the GPU.

Although aspects of this disclosure may be discussed in context of a video game console, a video game title, and/or a GPU, the disclosure is not limited to these implementations, and may be applied to any computing device and/or any parallel processing of commands. Various examples for implementing the capturing of commands in a multi-engine GPU are described herein with reference to FIGS. 1-7.

FIG. 1 illustrates a pictorial flow diagram of an example process 100 for capturing commands in a multi-engine graphics processing unit (GPU). FIG. 1 illustrates a high-level pictorial flow diagram, and additional details of the implementation are given throughout this disclosure.

At 102, the operation can include receiving an indication to capture an operation of a graphics processing unit (GPU), such as a multi-engine GPU (sometimes referred to as a GPU). As illustrated in example 104, a capture indication 106 may be received at a gaming console 108 from one or more service providers 110. In some instances, the service provider 110 may represent a software developer or programmer tasked with debugging a software title (such as a video game) running on the gaming console 108. The capture indication 106 can be generated at any time during operation of the software title (e.g., at a time in which graphics are rendered on a display associated with the gaming console 108). In some instances, the capture indication 106 can be generated in response to an error in a software title, and in some instances, the capture indication can be generated at the gaming console 108.

At 112, the operation can include capturing at least one command buffer segment. As illustrated in example 114, command (cmd) buffer segments 116 and 118 may be input to a graphics processing unit 120 for execution. In some instances, the command buffer segment 116 may represent a plurality of individual commands in a buffer associated with an individual engine in the GPU for rendering a frame of a software title on a display of a gaming device. That is, the command buffer segments 116 and 118 can include any number of commands, synchronization commands, and/or signals for executing commands within the multi-engine GPU 120. The operation 112 can include capturing one or more command buffer segments 116 and 118 associated with rendering one or more frames by the GPU 120.

At 122, the operation can include parsing the command buffer segment to identify at least one synchronization (sync) indication or command. As illustrated, example 124 shows a captured command buffer segment (e.g., corresponding to the command buffer segment 116) that includes a synchronization command 126. In some instances, the commands that follow the synchronization command 126 may not execute until the synchronization command 126 has been satisfied. In some instances, the command buffer segment 116 can include a plurality of synchronization commands.

At 128, the operation can include segmenting the command buffer segment into a first seglet and a second seglet, wherein the second seglet includes the synchronization command. In some instances, the operation 128 can be based on the synchronization command identified in the operation 122. As illustrated, example 130 shows a first seglet 132 including commands and a second seglet 134 including a synchronization command and two additional commands. In some instances, the operation 128 can include segmenting the command buffer segment into any number of seglets, based at least in part on the number of synchronization commands identified in the operation 122. That is, in some instances, the operation 128 is repeated (e.g., operates recursively) until each seglet includes at most one synchronization command. In any event, each seglet can be considered to be an atomic segment such that operations from other command buffer segments do not modify the memory associated with the seglet after the seglet has begun execution. In some instances, if N number of synchronization commands are identified in the operation 122, the operation 128 can segment the command buffer segment into N+1 number of segments. In some instances, any number of seglets can be determined.

At 136, the operation can include determining, for each seglet, if a synchronization command has been satisfied. As illustrated, example 138 shows the second seglet 134 including a synchronization command being signaled by a seglet 140 including a signal 142. The seglet 140 can represent another seglet associated with a separate command buffer segment that is operating on another engine of the multi-engine GPU 120. By way of example, the seglet 140 can include memory access commands to move memory into a register, while the seglet 134 can perform one or more drawing operations based upon that data. Thus, the seglet 134 waits until the engine associated with the seglet 140 executes the commands associated with the seglet 140 and signals the signal 142, which is provided to satisfy the synchronization command of the seglet 134. In some instances, and as explained herein, seglets with unsatisfied synchronization commands can be associated with a pending list, and in some instances, seglets with a satisfied synchronization command (or seglets without a synchronization command, such as the first seglet 132) can be associated with an execution list and executed in a sequence of commands by an engine of the GPU 120. In some instances, the seglet 140 can correspond to a seglet segmented from the command buffer segment 118.

At 144, the operation can include determining memory requirements for a seglet at a time of execution for the seglet. Example 146 illustrates the seglet 134 associated with a portion 148 of memory 150. For example, the memory portion 148 can correspond to memory that is utilized by the seglet 134 during execution of the seglet 134. In some instances, the memory portion 148 can include memory that is read by one or more commands of the seglet 134, and in some instances, the memory portion 148 can include memory that is allocated to one or more commands of the seglet 134 to be written by the seglet 134. In some instances, the memory portion 148 can be a subset of the memory 150, such that determining the memory requirements reduces an amount of memory that has to be captured in subsequent operations.

At 152, the operation can include capturing new memory or changed memory associated with the seglet execution. In some instances, memory associated with the memory portion 148 may have already been captured in another capturing operation, in which case, the operation 152 can be avoided in order to minimize duplication of captured memory. In some instances, the operation 152 can determine that memory associated with the seglet 134 is either new memory that has not been captured, or the memory has changed since the last time the memory was captured. In this instances, the operation can include capturing (e.g., copying) those portions of memory prior to the execution of the seglet 134 and/or after the execution of the seglet 134. As illustrated, example 154 shows the seglet 134 and the memory portion 148 captured and transmitted from the gaming console 108 to the service provider 110 in response to the capture indication 106, for example.

Figure 2:
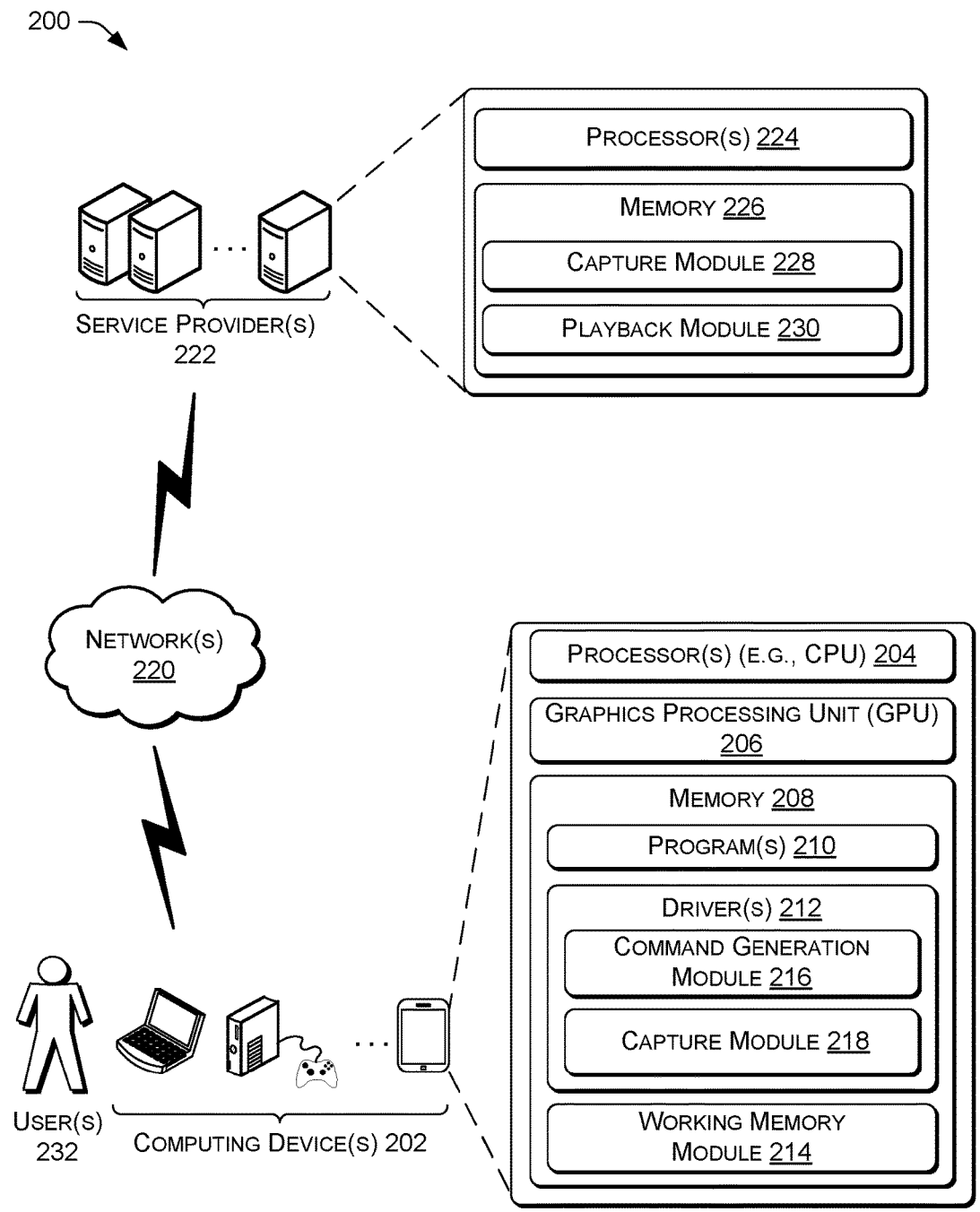
FIG. 2 illustrates an example environment for capturing commands in a computing device including a multi-engine GPU.

FIG. 2 illustrates an example environment 200 for capturing commands in a computing device including a multi-engine graphics processing unit (GPU). The environment 200 includes computing device(s) 202 having processor(s) 204 (e.g., a central processing unit (CPU)), a multi-engine graphics processing unit (GPU) 206, and a memory 208 including one or more program(s) 210, driver(s) 212, and a working memory module 214. In various instances, the driver(s) 212 can include a command generation module 216 and a capture module 218. The environment 200 also includes a network 220 to facilitate communications between the computing device 202 and service provider(s) 222. In some instances, the service provider(s) 222 provide one or more services to the computing device 202, such as initiation of the capturing operation and subsequent playback of the captured commands. To that end, the service provider 222 can include processor(s) 224 and a memory 226 including a capture module 228 and a playback module 230.

The computing device 202 can include, but is not limited to, any one of a variety of computing devices, such as a smart phone, a mobile phone, a personal digital assistant (PDA), an electronic book device, a laptop computer, a desktop computer, a tablet computer, a portable computer, a gaming device, a game console, a personal media player device, a server computer, a wearable device, or any other electronic device.

As introduced above, the computing device 202 can include one or more processor(s) 204, one or more multi-engine GPUs 206, and memory 208. The processor(s) 204 can be a single processing unit or a number of units, each of which could include multiple different processing units. The processor(s) 204 can include one or more microprocessors, microcomputers, microcontrollers, digital signal processors, central processing units (CPUs), security processors (e.g., secure cryptoprocessors), and/or other processors. Alternatively, or in addition, some or all of the techniques described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor(s) 204 can be configured to fetch and/or execute computer-readable instructions stored in the memory 208. In some instances, the processor(s) 204 can operate in conjunction with the GPU 206 to render frames for a display associated with the computing device 202.

The GPU 206 can include any number and any type of engines, such as graphics engines, compute engines, memory access engines, etc. In some instances, there may be multiple instances of the various engines to further facilitate parallel processing. In some instances, and as described herein, each engine can be associated with a buffer or queue where commands generated by the command generation module 216 can be stored until execution by a respective engine of the GPU 206.

The memory 208 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PCM), Static Random-Access Memory (SRAM), Dynamic Random-Access Memory (DRAM), other types of Random-Access Memory (RAM), Read-Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

In various embodiments, the computing device 202 can communicate with the service provider 222 via one or more wired or wireless networks 220, such as the Internet, Ethernet, a Mobile Telephone Network (MTN), or other various communication technologies. In some instances, the network 220 can include any WAN or LAN communicating via one or more wireless protocols including but not limited to RFID, near-field communications, optical (IR) communication, Bluetooth, Bluetooth low energy, ZigBee, Z-Wave, Thread, LTE, LTE-Advanced, WiFi, WiFi-Direct, LoRa, Homeplug, MoCA, Ethernet, etc.

In various embodiments, the memory 208 can include an operating system configured to manage hardware and services within and coupled to the computing device 202 for the benefit of other components and other devices.

The various components of the environment 200 can include hardware and/or software components. For example, the program(s) 210, the driver(s) 212, the working memory module 214, the capture module 228, and the playback module 230 can be implemented by one or more modules stored in the memory 208 or 226, respectively, and/or by one or more components of the processor(s) 204 or 224, or the GPU 206, respectively. As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions can be implemented (e.g., performed) in whole or in part by hardware logic components, such as FPGAs, ASICs, ASSPs, state machines, CPLDs, other logic circuitry, SoCs, and so on.

The program(s) 210 can include any software title operating on the computing device 202 that utilizes the GPU 206 of the computing device 202. In some instances, the program 210 can be a computationally and/or graphically intensive program, such as a video game. In some instances, the programs 210 provide API calls to the driver 212 to render content of a display of the computing device 202.

The driver(s) 212 can include the command generation module 216 and the capture module 218. In general, the driver(s) 212 can perform operations to convert API calls to from the programs 210 into commands that can be understood and/or executed by the GPU 206. In particular, the conversion of API calls to command buffer segments can be performed by the command generation module 216. The command generation module 216 can generate any number of command buffer segments for a particular engine of the GPU 206 for rendering one or more particular frames for display. In one implementation, the command generation module 216 can generate a single command buffer segment for each engine of the GPU 206 to render a single frame of content for display. In some instances, the command generation module 216 can generate one or more synchronization commands, and one or more signals, to introduce dependencies between the various command buffer segments associated with various engines of the GPU 206.

The capture module 218 can perform operations to capture one or more command buffer segments generated by the driver 212. In some instances, the capture module 218 can perform operations in response to receiving a capture indication from the service provider 222, for example. In some instances, the capture module 218 can perform operations to identify synchronization commands, segment command buffer segments into seglets, and to determine memory requirements at a time of execution of the various seglets. In some instances, the capture module 218 can capture a state of memory associated with each seglet, which may include determining if memory has previously been captured and/or determining if previously captured memory has been modified since the memory was captured. In some instances, the capture module 218 can generate a playback file including seglets and associated memory to be transmitted to the service provider 222, for example.

The working memory module 214 can correspond to a portion of the memory 208 allocated to the command buffer segments associated with execution of the program 210 and/or the driver 212. For example, the working memory module 214 can include memory read by or written to the command buffer segments to render content on a display of the computing device 202.

The capture module 228 can perform operations to initiate a capture operation on the computing device 202. For example, the capture module 228 can receive an indication from a developer or programmer and can provide a capture indication to the computing device 202. In some instances, the capture module 228 can provide the functionality of the capture module 218 to the computing device 202 (while operating remotely on the service provider 222).

The playback module 230 can perform operations to execute commands and to load memory states associated with a playback file generated by the computing device 202 and provided to the service provider 222. In some instances, the playback module 230 can provide an interface (e.g., a display) associated with the service provider 222 to illustrate an occupancy of each engine of the GPU 206 as captured by the capture module 218. To that end, the playback module 230 can perform operations to determine an occupancy of each engine of the GPU for rendering a particular frame associated with a software title or video game. In some instances, the playback module 230 allows a developer to step through an execution of each individual seglet. In some instances, the captured commands can be played back serially by inserting additional synchronization commands between the seglets on each engine of the GPU, and in some instances, the playback module 230 can execute the seglets with the original synchronization commands as provided by the driver 212 to facilitate analysis of the multi-engine operation of the GPU 206.

The service provider 222 can include one or more computing devices, such as one or more desktop computers, laptop computers, servers, and the like. The one or more computing devices can be configured in a cluster, data center, cloud computing environment, or a combination thereof. In one example, the one or more computing devices provide cloud computing resources, including computational resources, storage resources, and the like, that operate remotely from the computing device 202.

The environment 200 also includes the one or more users 232 to employ the computing device 202. The one or more users 232 can interact with the computing device 202 to perform a variety of operations.

The operations of these components are explained above in connection with FIG. 1 and further explained in connection with FIGS. 3-7 of this disclosure.

Figure 3:
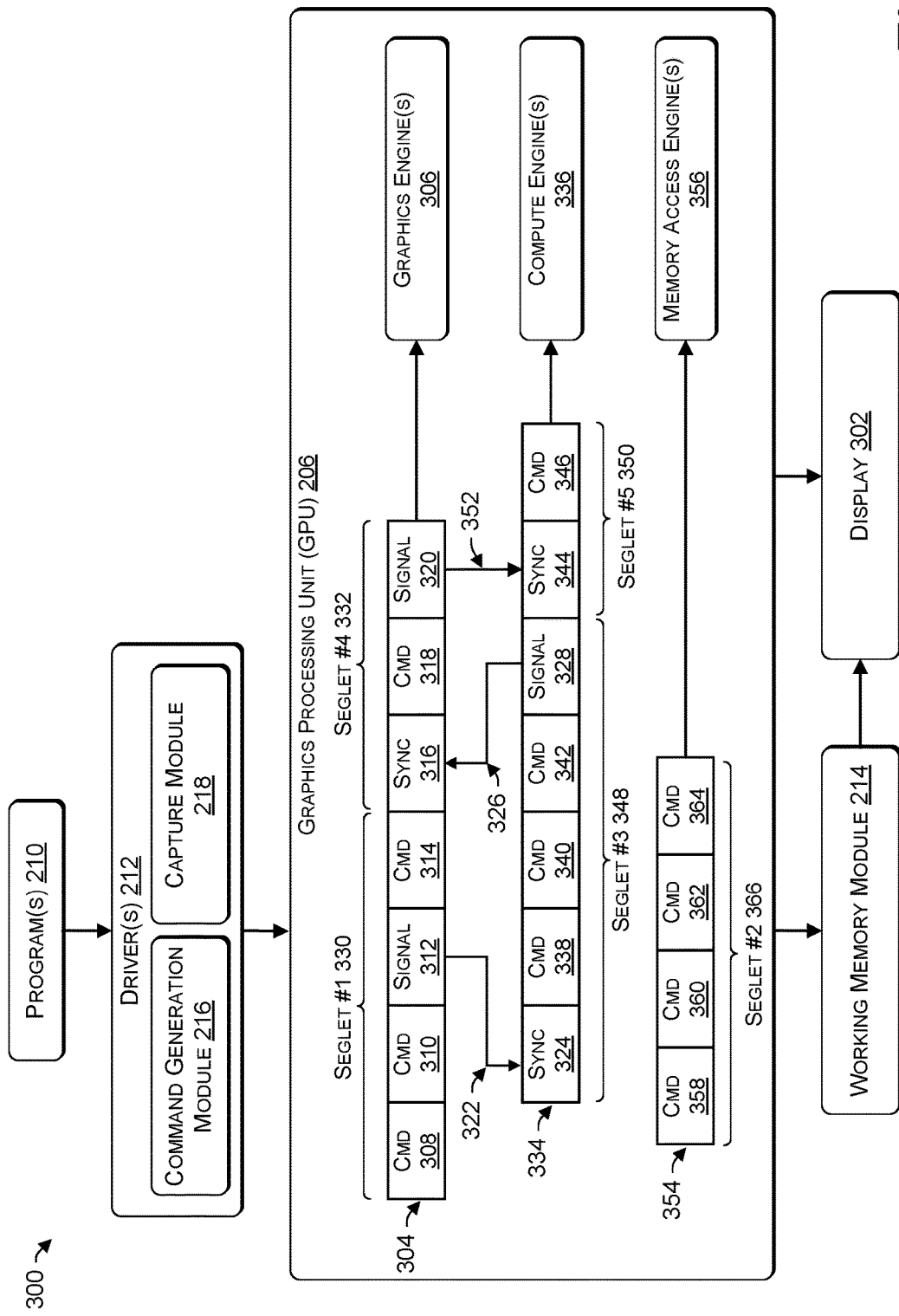
FIG. 3 illustrates an example environment for capturing and segmenting commands in a multi-engine GPU.

FIG. 3 illustrates an example environment 300 for capturing and segmenting commands in a multi-engine GPU. As illustrated, the environment 300 includes the program(s) 210, the driver(s) 212, the command generation module 216, the capture module 218, the graphics processing unit 206, and the working memory module 214 of FIG. 2. Further details are provided in connection with capturing the commands for playback, as described herein.

As discussed above, the program(s) 210 can generate and provide one or more API calls (or other instruction or commands) to the driver(s) 212 to render content on a display 302 of a computing device (e.g., the computing device 202). Based at least in part on the API calls received from the program(s) 210, the command generation module 216 can generate one or more command buffer segments for the GPU 206.

For example, the command generation module 216 can generate a command buffer segment 304 for graphics engine(s) 306. In some instances, there may be a plurality of graphics engine(s) 306, in which case, a command buffer segment can be provided to each individual graphics engine as needed.

The command buffer segment 304 can be executed by the graphics engine 306, with individual commands 308 and 310 executed serially in the order the commands are placed into a command buffer. That is, the graphics engine 306 can execute the command 308 followed by the command 310, followed by a signal commands 312 and a command 314. In this example, the commands 308, 310, 312, and 314 do not depend on a synchronization command, so the commands can be serially executed by the graphics engine 306. Based at least in part on executing the signal command 312, the graphics engine 306 can provide a signal indication 322 to a corresponding synchronization command 324. Further, at a time in which a synchronization command 316 is input to the graphics engine 306 for execution, if the synchronization command 316 remains unsatisfied (e.g., the synchronization command 316 has not received a signal indication 326 from a corresponding signal command 328), the graphics engine 306 can wait and may not execute a command 318 and a signal command 320 until the synchronization command 316 is satisfied.

Upon receiving a capture indication, the capture module 218 can capture the command buffer segment 304, identify any synchronization command(s) in the command buffer segment 304, and segment the command buffer segment 304 into a seglet 330 and a seglet 332 based in part on the identified synchronization command.

The command generation module 216 can further generate a command buffer segment 334 to be executed by compute engine(s) 336. In one particular example, the command buffer segment 334 can include (in order of execution), the synchronization command 324, commands 338, 340, and 342, followed by the signal command 328, and further followed by a synchronization command 344 and a command 346. Thus, based on the synchronization commands 324 and 344, the command buffer segment 334 can be decomposed into a seglet 348 and a seglet 350. As illustrated, the synchronization command 344 depends on a signal indication 352 corresponding to the signal command 320 associated with the seglet 332. Thus, the seglet 350 may not begin execution until the synchronization command 344 is satisfied by the signal indication 352 (regardless of whether the seglet 332 is ready to be executed by the graphics engine 306 before the seglet 350 is ready to be executed by the compute engine 336).

The command generation module 216 can further generate a command buffer segment 354 to be executed by the memory access engine(s) 356. In one particular example, the command buffer segment 354 includes commands 358, 360, 362, and 364. As the command buffer segment 354 does not include any synchronization commands in this example, the command buffer segment 354 can be executed in serial by the memory access engine 356 without any dependencies on other command buffer segments. Accordingly, the command buffer segment 354 can correspond to a seglet 366 determined by the capture module 218.

In some instances, the capture module 218 can determine a temporal execution of the seglets 330, 332, 348, 350, and 366 as they relate to one another. That is, the location of the commands in FIG. 3 can correspond to a time in which the commands are inserted into a buffer associated with a respective engine of the GPU. Thus, when determining a playback order of the various seglets, the capture module 218 can determine an order of the seglets to be executed. Thus, the seglet 330 can be referred to as seglet #1, the seglet 366 can be referred to as seglet #2, the seglet 348 can be referred to as seglet #3, the seglet 332 can be referred to as seglet #4, and the seglet 350 can be referred to as seglet #5. Further details of the capture of the seglets 330, 332, 348, 350, and 366 are described in connection with FIG. 4.

Figure 4:
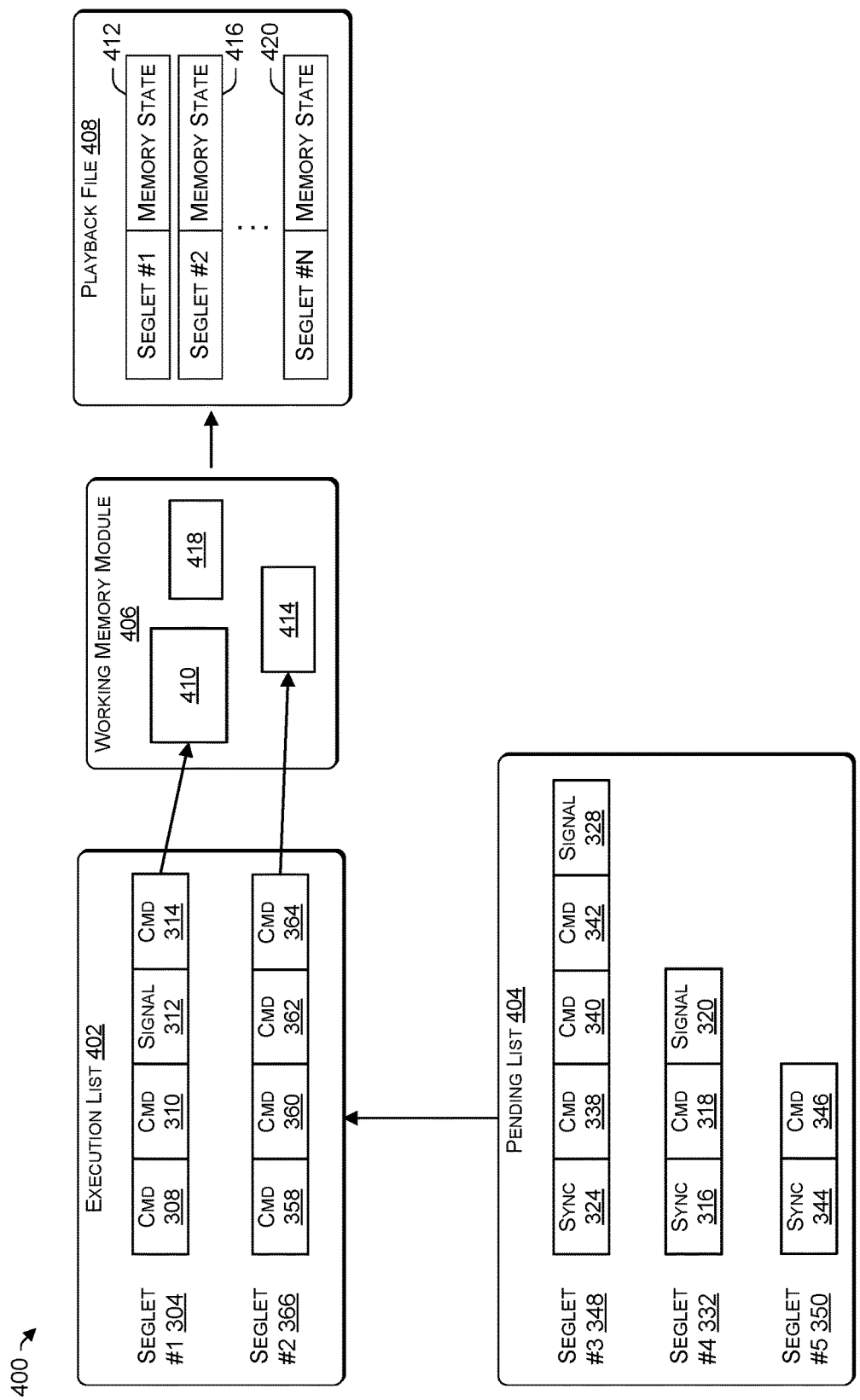
FIG. 4 illustrates an example environment for generating a playback file for captured GPU commands.

FIG. 4 illustrates an example environment 400 for generating a playback file for captured GPU commands. As illustrated, the captured GPU commands correspond to the seglets 304, 366, 348, 332, and 350 captured and segmented in connection with FIG. 3. The environment 400 includes an execution list 402, a pending list 404, a working memory module 406, and a playback file 408.

In some instances, the execution list 402 includes seglet #1 304 and seglet #2 366, as the two seglets 304 and 366 do not include unsatisfied synchronization commands. Thus, the seglets 304 and 366 can be executed by the respective engines of the GPU, for example. At the time of execution, capturing the seglet #1 304 can include determining a portion of memory 410 associated with the execution of the seglet #1 304. For example, determining the portion of memory 410 can include parsing the seglet #1 304 to determine any memory addresses read from or written to by the seglet #1 304 during the execution of the seglet #1 304. In some instances, the state of the portion of the memory 410 (e.g., all the data associated with the portion of the memory 410) can be determined and stored in the playback file with the seglet commands. For example, a memory state 412 corresponding to the portion of the memory 410 can be stored in the playback file 408.

Similarly, a portion of the memory 414 may be determined to correspond to the execution of the seglet #2 366, and a state of the memory 416 corresponding to the portion of the memory 414 can be stored in the playback file 408.

The working memory module 406 can include data relating to any number of seglets, which may or may not correspond to the seglets included in the execution list 402. For example, the working memory module 406 can include a portion of the memory 418.

As FIG. 4 represents one snapshot of time, it can be understood in the context of the disclosure that the composition of the execution list 402 and the pending list 404 may be updated as various seglets are executed and as various synchronization commands are satisfied. For example, as the seglet #1 304 is executed, the signal command 312 may provide a signal indication to the corresponding synchronization command 324 in the seglet #3 348, at which time, the seglet #3 348 can be moved from the pending list 404 to the execution list 402 and a memory requirements and a state of memory can be determined for the seglet #3 348. Accordingly, the playback file 408 can be generated as various seglets are executed to include a state of the memory 420 corresponding to any number of seglets. In some instances, the playback file 408 can be generated for one or more seglets associated with displaying a particular frame for display. In some instances, the playback file 408 can be transmitted from the computing device 202 to the service provider 222, for example, for subsequent playback and analysis.

The example processes (e.g., in FIGS. 1 and 5-7) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 5:
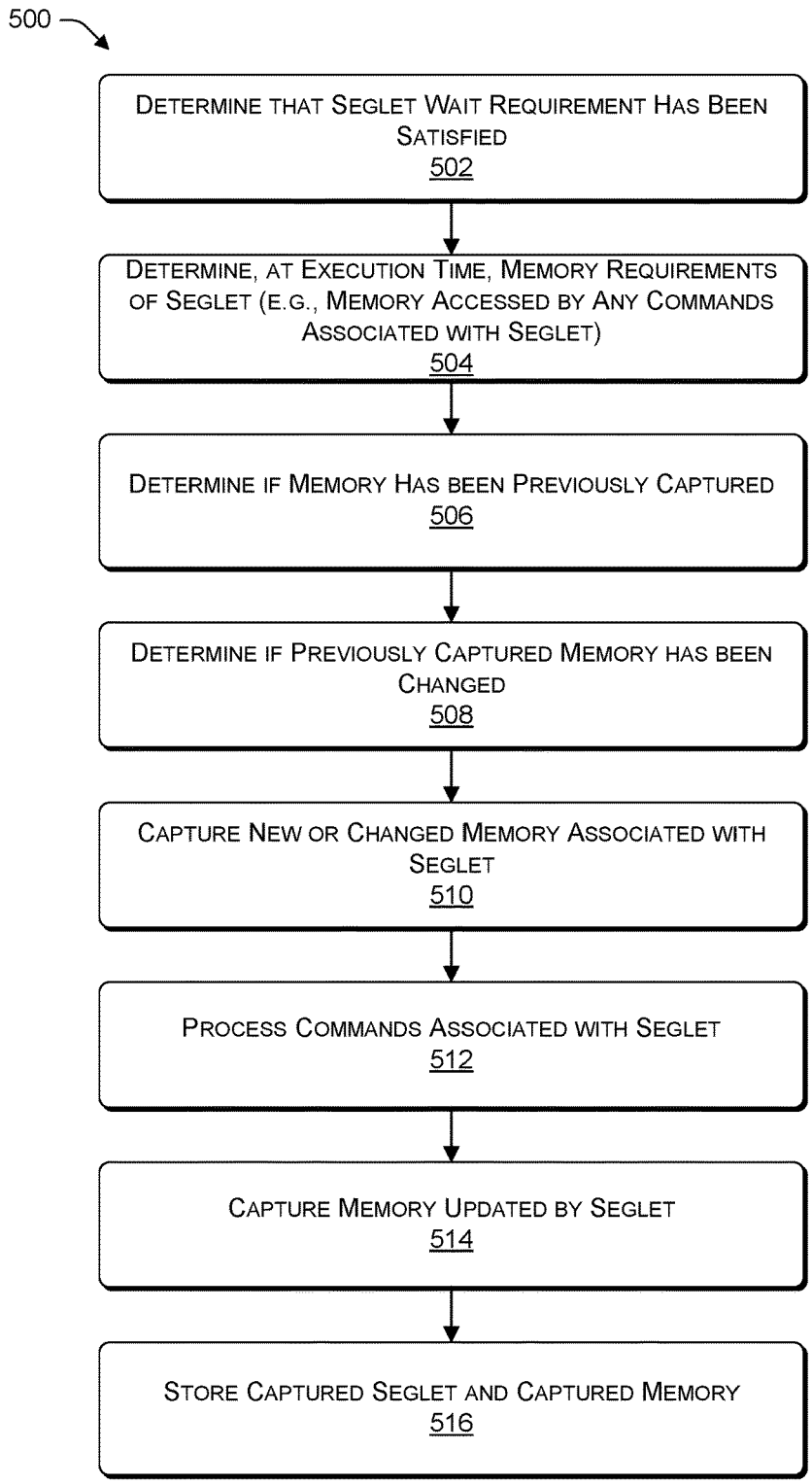
FIG. 5 is an example process for determining memory requirements for a seglet and capturing memory associated with the seglet.

FIG. 5 is an example process 500 for determining memory requirements for a seglet and capturing memory associated with the seglet. In one implementation, the example process 500 can be performed by the computing device 202 and/or by the service provider 222 of FIG. 2. Exemplary implementations of FIG. 5 are provided in connection with FIGS. 1, 3, and 4, for example. However, processes can be performed in other environments and by other devices as well.

At 502, the operation can include determining that a seglet wait requirement has been satisfied. In some instances, this operation may include receiving a signal indication at a first engine of the GPU where a command buffer segment is waiting for execution. In some instances, the signal indication can be generated by a second engine of the GPU executing a signal command. In some instances, the wait requirement can correspond to a binary indication (e.g., execute or do not execute), or can correspond to a register value being over a threshold value (e.g., execute if value>threshold). In some instances, if the wait requirement has not been satisfied, a seglet can be associated with a pending list, as described herein. In some instances, when the wait requirement (e.g., the synchronization command) has been satisfied, the seglet can be associated with an execution list instead of the pending list, as described herein.

At 504, the operation can include determining, at an execution time, memory requirements for the seglet. For example, memory requirements for the seglet may include memory accessed by any commands associated with the seglet. In some instances, the memory requirements may include addresses or a range of addresses of memory or registers.

At 506, the operation can include determining if the memory corresponding to the memory requirements determined in the operation 504 has been previously captured. For example, in some instances, the memory can be captured in connection with a separate seglet, or captured in connection with some other operation.

At 508, the operation can include determining whether previously captured memory has been changed. In some instances, this operation can include comparing a state of previously captured memory with a current state of the memory to determine if there is a difference. In some instances, the memory can include indications of when the memory was last updated. In such a case, this operation 508 can include comparing a marker or flag of the captured memory with the memory corresponding to the memory requirements to determine if the memory has been changed.

At 510, the operation can include capturing new memory or changed memory associated with the execution of the particular seglet. In some instances, by capturing new memory or changes in memory, this operation 510 can avoid duplicating memory capture operations, which may reduce an amount of memory required for the capture operation.

At 512, the operation can include processing the commands associated with the seglet. In some instances, this operation 512 can include executing the seglet by a particular engine of the GPU. In some instances, the operation can include reading or writing values from or to memory. In some instances, processing commands associated with the seglet can include providing a signal indication to another synchronization command associated with another seglet operating in connection with another engine of the GPU.

At 514, the operation can include capturing any memory updated by the seglet, based at least in part on the processing operations performed the operation 512. For example, if the operation 512 stored values as a result of some processing or work associated with the commands, the operation 514 can capture the updated values or data.

At 516, the operation can include storing the captured seglet and the captured memory. In some instances, the captured seglet and the captured memory are stored in a playback file to be transmitted to a service provider by the computing device processing the seglet commands.

Figure 6:
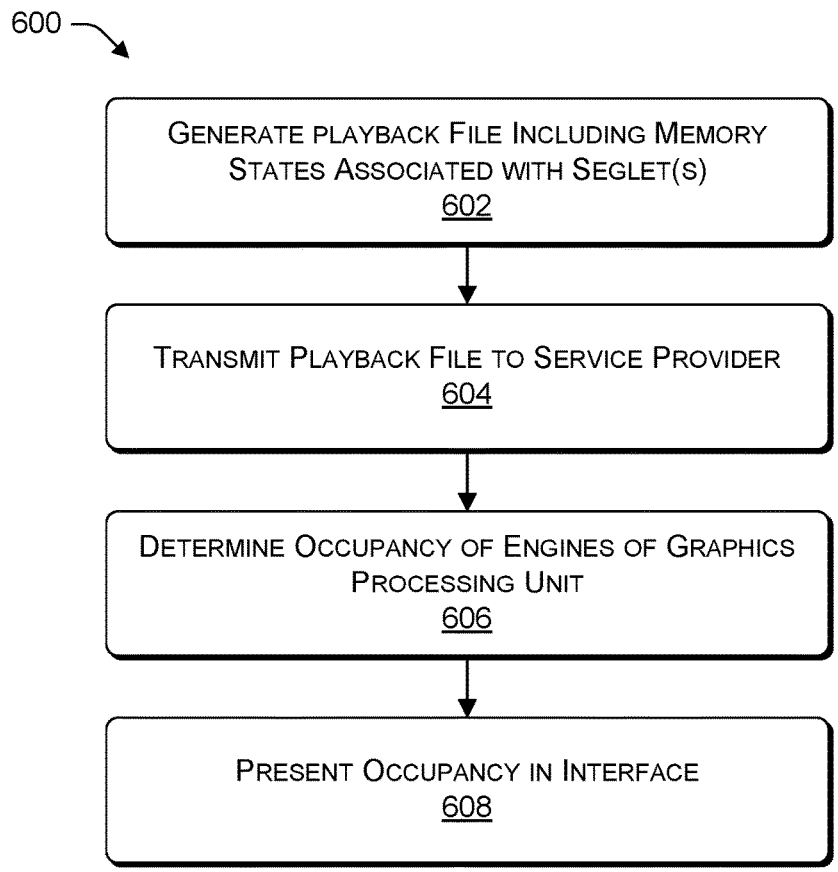
FIG. 6 is an example process for determining occupancy of one or more engines in a multi-engine GPU.

FIG. 6 is an example process 600 for determining occupancy of engines in a GPU. In one implementation, the example process 600 can be performed by the computing device 202 and/or by the service provider 222 of FIG. 2. However, processes can be performed in other environments and by other devices as well.

At 602, the operation can include generating a playback file including memory states associated with one or more seglets. For example, the playback file can include a plurality of seglets and associated memory states for some or all engines of a multi-engine GPU. In some instances, the playback file can include an initial memory state and changes of the memory states over time based on the execution of the various seglets. In some instances, the playback file can include the associated API calls generated by a program that was converted into the command buffer segments, such that the seglets can be associated with the corresponding original API call. In some instances, the playback file can include seglets associated with one or more frames to be displayed on a computing device.

At 604, the operation can include transmitting the playback file to a service provider, such as the service provider 222 of FIG. 2. In some instances, the playback file can be transmitted as seglets associated with one single frame is captured, while in some embodiments, the playback file can be transmitted when a number of seglets or a number of frames reaches a threshold value.

At 606, the operation can include determining an occupancy of one or more engines of the multi-engine GPU. In some instances, the occupancy of an engine can correspond to a comparison of an amount of time an engine is executing commands compared to a total amount of time available for executing commands. Thus, in some instances, a higher occupancy corresponds to less unused time by an engine of the GPU.

At 608, the operation can include presenting the occupancy in an interface, such as a display of the service provider or a computing device. In some instances, the occupancy can be displayed as a graph over time, with the occupancy of an engine varying as commands are executed to render one or more frames for display.

Figure 7:
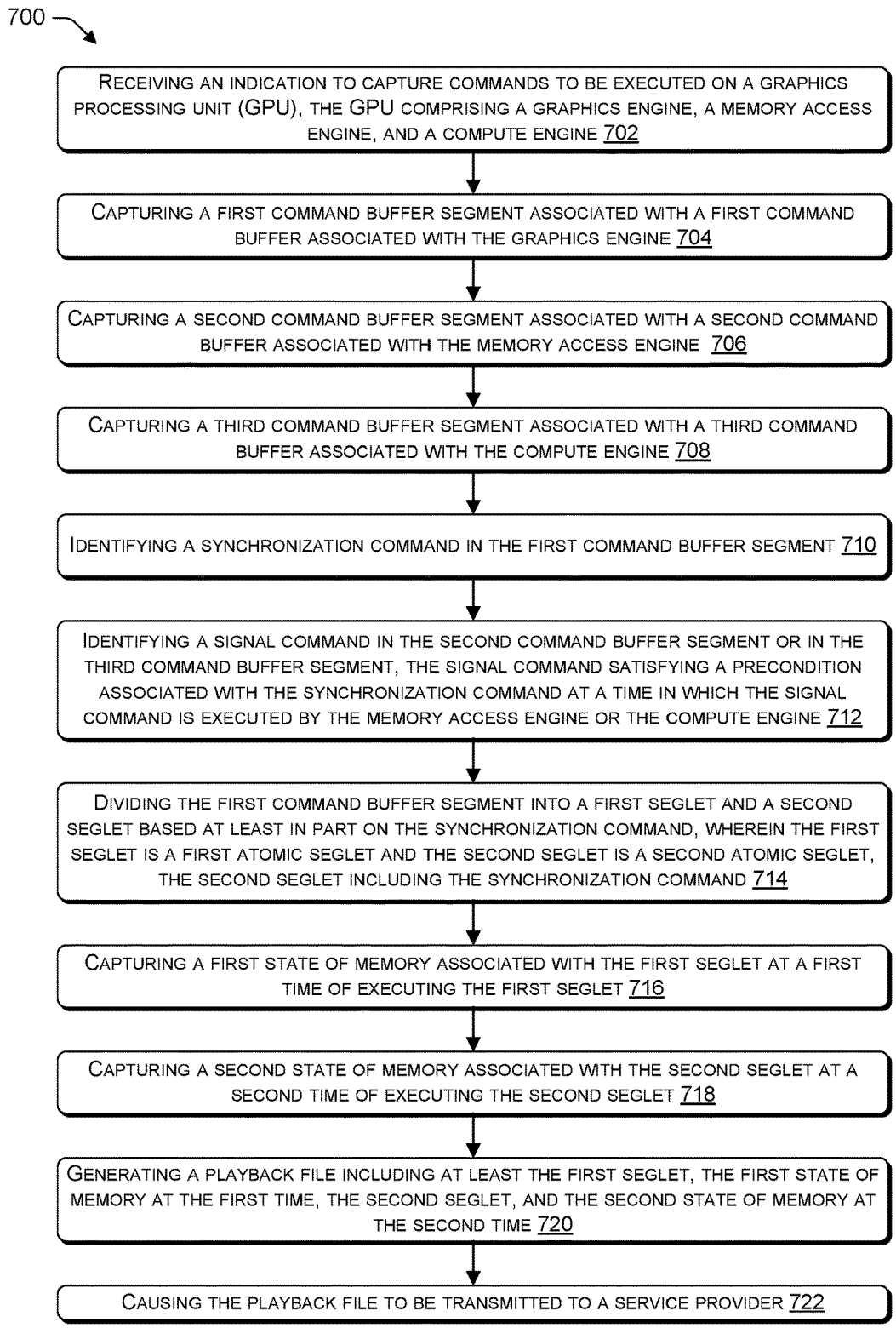
FIG. 7 is an example process for capturing commands in a multi-engine GPU.

FIG. 7 is an example process 700 for capturing commands in a multi-engine GPU. In one implementation, the example process 700 can be performed by the computing device 202 and/or by the service provider 222 of FIG. 2. However, processes can be performed in other environments and by other devices as well.

At 702, the operation can include receiving an indication to capture commands to be executed on a graphics processing unit (GPU), the GPU comprising a graphics engine, a memory access engine, and a compute engine. In some instances, the indication can be received at a computing device, such as a gaming console, from a service provider. In some instances, the indication can be generated based at least in part on an error or an expected error in a software title, such as a video game, operating on the computing device. In some instances, the computing device can generate and receive the indication to capture commands.

At 704, the operation can include capturing a first command buffer segment associated with a first command buffer associated with the graphics engine. In some instances, the GPU can include any number of engines, with each engine associated with a command buffer. Command buffer segments can be stored in the command buffer to be executed by the engine in the order that the commands were input to the command buffer (e.g., using a first-in first-out (FIFO) structure). Similarly, at 706, the operation can include capturing a second command buffer segment associated with a second command buffer associated with the memory access engine. And at 708, the operation can include capturing a third command buffer segment associated with a third command buffer associated with the compute engine. In some instances, the first command buffer segment, the second command buffer segment, and the third command buffer segment are associated with commands that are directed to rendering a same frame for display by the computing device.

At 710, the operation can include identifying a synchronization command in the first command buffer segment. In some instances, the synchronization command can include a precondition that must be satisfied before subsequent commands in the first command buffer segment are executed by the respective engine. In some instances, the precondition associated with the synchronization command can be satisfied by receiving a signal or an indication from a signal command associated with another command buffer segment when the signal command is executed by a respective engine of the GPU. In some instances, command buffer segments can include a plurality of synchronization commands, whereby various synchronization commands are associated with signal commands from other various command buffer segments. In some instances, a synchronization command can be satisfied by a condition or event outside of the GPU, such as by a command from a driver, a CPU, etc.

At 712, the operation can include identifying a signal command in the second command buffer segment or in the third command buffer segment, the signal command satisfying a precondition associated with the synchronization command at a time in which the signal command is executed by the memory access engine or the compute engine. In some instances, the synchronization command may cause a respective engine (e.g., the graphics engine) to wait until the signal condition is executed by a respective engine (e.g., the memory access engine or the compute engine).

At 714, the operation can include dividing the first command buffer segment into a first seglet and a second seglet based at least in part on the synchronization command, wherein the first seglet is a first atomic seglet and the second seglet is a second atomic seglet, the second seglet including the synchronization command. In some instances, a command buffer segment can be divided into any number of seglets. In some instances, a number of seglets may depend on a number of synchronization commands included in the command buffer segment. In some instances, an atomic seglet refers to commands that, when executed by a respective engine of the GPU, are associated with memory that may not be altered by other command buffer segments or seglets while the atomic seglet is executing.

At 716, the operation can include capturing a first state of memory associated with the first seglet at a first time of executing the first seglet. In some instances, a state of memory can include all data associated with memory addresses accessed by the seglet during execution. In some instances, the state of memory may include only updated memory values when referring to an earlier state of memory.

At 718, the operation can include capturing a second state of memory associated with the second seglet at a second time of executing the second seglet.

At 720, the operation can include generating a playback file including at least the first seglet, the first state of memory at the first time, the second seglet, and the second state of memory at the second time. In some instances, the playback file can include all commands and memory states needed to recreate an optimal execution of command on the GPU.

At 722, the operation can include causing the playback file to be transmitted to a service provider. In some instances, at the service provider, the playback file can be used to simulate or recreate the operation of the GPU executing the commands associated with the playback file. Thus, having captured commands and memory states in a playback file and transmitted the playback file to the service provider, programmers or developers can use the playback file to optimize an operation of a software title, hardware, drivers, etc., thereby improving a functioning of a computing device.

Example Clauses

Example A, a system comprising: one or more processors; and memory storing instructions that, when executed by the one or more processors, cause the system to perform operations comprising: receiving an indication to capture commands to be executed on a graphics processing unit (GPU), the GPU comprising a graphics engine, a memory access engine, and a compute engine; capturing a first command buffer segment associated with a first command buffer associated with the graphics engine; capturing a second command buffer segment associated with a second command buffer associated with the memory access engine; capturing a third command buffer segment associated with a third command buffer associated with the compute engine; identifying a synchronization command in the first command buffer segment; identifying a signal command in the second command buffer segment or in the third command buffer segment, the signal command satisfying a precondition associated with the synchronization command at a time in which the signal command is executed by the memory access engine or the compute engine; dividing the first command buffer segment into a first seglet and a second seglet based at least in part on the synchronization command, wherein the first seglet is a first atomic sequence of commands and the second seglet is a second atomic sequence of commands, the second seglet including the synchronization command; capturing a first state of memory associated with the first seglet at a first time of executing the first seglet; capturing a second state of memory associated with the second seglet at a second time of executing the second seglet; generating a playback file including at least the first seglet, the first state of memory at the first time, the second seglet, and the second state of memory at the second time; and causing the playback file to be transmitted to a service provider.

Example B, the system of Example A, wherein the first command buffer segment, the second command buffer segment, and the third command buffer segment are associated with rendering a same frame for display.

Example C, the system of Example A or Example B, the operations further comprising receiving the first command buffer segment, the second command buffer segment, and the third command buffer segment from a driver associated with a game console comprising the GPU.

Example D, the system of any one of Example A through Example C, wherein capturing the first state of memory comprises determining addresses associated with at least a portion of memory accessed by the first seglet during execution of the first seglet.

Example E, the system of any one of Example A through Example D, wherein the operations further comprise: determining a third seglet including at least the signal command; and executing the third seglet prior to executing the second seglet such that the signal command satisfies the precondition associated with the synchronization command at the time of executing the signal command.

While Example A through Example E are described above with respect to a system, it is understood in the context of this document that the content of Example A through Example E may also be implemented via a device, computer storage media, and/or a method.

Example F, a computer-implemented method comprising: receiving, at a computing device, an indication to capture an operation associated with a graphics processing unit (GPU); capturing at least one command buffer segment to be executed by the GPU; identifying at least one synchronization command in the at least one command buffer segment; based at least in part on the at least one synchronization command, segmenting the at least one command buffer segment into a first seglet and a second seglet; determining at least one memory requirement for the first seglet or the second seglet at a time of executing the first seglet or the second seglet; and capturing at least a portion of memory associated with the at least one memory requirement at the time of executing the first seglet or the second seglet.

Example G, the computer-implemented method of Example F, wherein the second seglet includes the at least one synchronization command, the computer-implemented method further comprising: receiving a signal indicating an execution of a signal command associated with the at least one synchronization command; determining that the at least one synchronization command is satisfied; and executing, by the GPU, the second seglet based at least in part on the at least one synchronization command being satisfied.

Example H, the computer-implemented method of Example F or Example G, further comprising: generating a playback file including at least the first seglet and the at least the portion of memory associated with the at least one memory requirement; and transmitting, by the computing device, the playback file to a service provider.

Example I, the computer-implemented method of any one of Example F through Example H, wherein the time of executing the first seglet or the second seglet is a first time of executing the first seglet, wherein the at least one memory requirement is a first memory requirement associated with the first seglet, and wherein the at least the portion of memory is a first portion of memory associated with the first seglet, the computer-implemented method further comprising: determining a second memory requirement for the second seglet at a second time of executing the second seglet; determining that at least a subset of memory associated with the first memory requirement corresponds to the second memory requirement; and capturing at least a second portion of memory at the time of executing the second seglet, the at least the second portion of memory not including the at least the subset of memory associated with the first memory requirement.

Example J, the computer-implemented method of any one of Example F through Example I, wherein the GPU comprises at least two engines, the computer-implemented method further comprising: capturing a first command buffer segment associated with a first engine of the GPU; and capturing a second command buffer segment associated with a second engine of the GPU; wherein the first command buffer segment and the second command buffer segment are associated with a same frame to be displayed.

Example K, the computer-implemented method of any one of Example F through Example J, further comprising: receiving an application program interface (API) call from a program to render content on a display; and based at least in part on the API call, generating the at least one command buffer segment to render the content on the display.

Example L, the computer-implemented method of any one of Example F through Example K, further comprising: determining that the first seglet is to be executed at a first time; associating the first seglet with an execution list; determining, based at least in part on the at least one synchronization command, that the second seglet is not to be executed at the first time; associating the second seglet with a pending list; and executing one or more commands associated with the first seglet at the first time.

Example M, the computer-implemented method of any one of Example F through Example L, wherein the first seglet includes a first set of commands spanning from a start of the at least one command buffer segment to a command or signal command immediately before the at least one synchronization command, and wherein the second seglet includes a second set of commands spanning from the at least one synchronization command to an end of the at least one command buffer segment or another synchronization command.

Example N, the computer-implemented method of any one of Example F through Example M, further comprising delaying an execution of the second seglet until a time in which a precondition associated with the at least one synchronization command is satisfied.

While Example F through Example N are described above with respect to a method, it is understood in the context of this document that the content of Example F through Example N may also be implemented via a device, system, and/or computer storage media.

Example O, a system comprising: one or more processors; and memory storing instructions that, when executed by the one or more processors, cause the system to perform operations comprising: receiving an indication to capture an operation associated with a graphics processing unit (GPU); capturing at least one command buffer segment to be executed by the GPU; identifying at least one command in the at least one command buffer segment associated with an execution precondition; based at least in part on the at least one command, segmenting the at least one command buffer segment into a first seglet and a second seglet; determining at least one memory requirement for the first seglet or the second seglet at a time of executing the first seglet or the second seglet; and capturing at least a portion of memory associated with the at least one memory requirement at the time of executing the first seglet or the second seglet.

Example P, the system of Example O, the operations further comprising: generating a playback file including at least the first seglet and the at least the portion of memory associated with the at least one memory requirement; and transmitting, by the computing device, the playback file to a service provider.

Example Q, the system of Example O or Example P, wherein the time of executing the first seglet or the second seglet is a first time of executing the first seglet wherein the at least one memory requirement is a first memory requirement associated with the first seglet, and wherein the at least the portion of memory is a first portion of memory associated with the first seglet, the operations further comprising: determining a second memory requirement for the second seglet at a time of executing the second seglet; determining that at least a subset of memory associated with the first memory requirement corresponds to the second memory requirement; and capturing at least a second portion of memory at the time of executing the second seglet, the at least the second portion of memory not including the at least the subset of memory associated with the first memory requirement.

Example R, the system of any one of Example O through Example Q, wherein the GPU comprises at least two engines, the operations further comprising: capturing a first command buffer segment associated with a first engine of the GPU; and capturing a second command buffer segment associated with a second engine of the GPU; wherein the first command buffer segment and the second command buffer segment are associated with a same frame to be displayed.

Example S, the system of any one of Example O through Example R, wherein the first seglet includes a first set of commands spanning from a start of the at least one command buffer segment to a command or signal command immediately before the at least command associated with the execution precondition, and wherein the second seglet includes a second set of commands spanning from the at least one command associated with the execution precondition to an end of the at least one command buffer segment or another command associated with another execution precondition.

Example T, the system of any one of Example O through Example S, the operations further comprising delaying an execution of the second seglet until a time in which a precondition associated with the at least one command is satisfied.

While Example O through Example T are described above with respect to a system, it is understood in the context of this document that the content of Example O through Example T may also be implemented via a device, computer storage media, and/or a method.

CONCLUSION

Although the present disclosure can use language that is specific to structural features and/or methodological operations, the disclosure is not limited to the specific features or operations described herein. Rather, the specific features and operations are disclosed as illustrative forms of implementing the disclosure.

What is claimed is:

1. A system comprising:
one or more processors; and
memory storing instructions that, when executed by the one or more processors, cause the system to perform operations comprising:
receiving an indication to capture commands to be executed on a graphics processing unit (GPU), the GPU comprising a graphics engine, a memory access engine, and a compute engine;
capturing a first command buffer segment associated with a first command buffer associated with the graphics engine;
capturing a second command buffer segment associated with a second command buffer associated with the memory access engine;
capturing a third command buffer segment associated with a third command buffer associated with the compute engine;
identifying a synchronization command in the first command buffer segment;
identifying a signal command in the second command buffer segment or in the third command buffer segment, the signal command satisfying a precondition associated with the synchronization command at a time in which the signal command is executed by the memory access engine or the compute engine;
dividing the first command buffer segment into a first seglet and a second seglet based at least in part on the synchronization command, wherein the first seglet is a first atomic sequence of commands and the second seglet is a second atomic sequence of commands, the second seglet including the synchronization command;
capturing a first state of memory associated with the first seglet at a first time of executing the first seglet;
capturing a second state of memory associated with the second seglet at a second time of executing the second seglet;
generating a playback file including at least the first seglet, the first state of memory at the first time, the second seglet, and the second state of memory at the second time; and
causing the playback file to be transmitted to a service provider.

2. The system of claim 1, wherein the first command buffer segment refers to all graphic engine commands for rendering a frame for display, the second command buffer segment refers to all memory access engine commands for rendering the frame for display, and the third command buffer segment refers to all compute engine commands for rendering the frame for display.

3. The system of claim 1, the operations further comprising receiving the first command buffer segment, the second command buffer segment, and the third command buffer segment from a driver associated with a game console comprising the GPU.

4. The system of claim 1, wherein capturing the first state of memory comprises determining addresses associated with at least a portion of memory accessed by the first seglet during execution of the first seglet.

5. The system of claim 1, wherein the operations further comprise:
determining a third seglet including at least the signal command; and
executing the third seglet prior to executing the second seglet such that the signal command satisfies the precondition associated with the synchronization command at the time of executing the signal command.

6. A computer-implemented method comprising:
receiving, at a computing device, an indication to capture an operation associated with a graphics processing unit (GPU), the GPU comprising a graphics engine, a memory access engine, and a compute engine;
capturing a first command buffer segment to be executed by the graphics engine;
capturing a second command buffer segment to be executed by the memory access engine;
capturing a third command buffer segment to be executed by the compute engine;
identifying a synchronization command in the first command buffer segment;
identifying a signal command in the second command buffer segment or in the third command buffer segment, the signal command satisfying a precondition associated with the synchronization command at a time in which the signal command is executed by the memory access engine or the compute engine;
based at least in part on the synchronization command and the signal command, segmenting the first command buffer segment into a first seglet and a second seglet, wherein the first seglet is a first atomic sequence of commands and the second seglet is a second atomic sequence of commands;
determining at least one memory requirement for the first seglet or the second seglet at a time of executing the first seglet or the second seglet;
capturing at least a portion of memory associated with the at least one memory requirement at the time of executing the first seglet or the second seglet; and
generating a playback file including at least the first seglet, the at least the portion of memory associated with the at least one memory requirement, and the second seglet.

7. The computer-implemented method of claim 6, further comprising:
transmitting, by the computing device and over a network, the playback file to a service provider.

8. The computer-implemented method of claim 6, wherein the time of executing the first seglet or the second seglet is a first time of executing the first seglet, wherein the at least one memory requirement is a first memory requirement associated with the first seglet, and wherein the at least the portion of memory is a first portion of memory associated with the first seglet, the computer-implemented method further comprising:
determining a second memory requirement for the second seglet at a second time of executing the second seglet;
determining that at least a subset of memory associated with the first memory requirement corresponds to the second memory requirement; and
capturing at least a second portion of memory at the time of executing the second seglet, the at least the second portion of memory not including the at least the subset of memory associated with the first memory requirement.

9. The computer-implemented method of claim 6, wherein the first command buffer segment and the second command buffer segment are associated with a same frame to be displayed.

10. The computer-implemented method of claim 6, further comprising:
receiving an application program interface (API) call from a program to render content on a display; and based at least in part on the API call, generating at least the first command buffer segment to render the content on the display.

11. The computer-implemented method of claim 6, further comprising:
   determining that the first seglet is to be executed at a first time;
   associating the first seglet with an execution list;
   determining, based at least in part on the synchronization command, that the second seglet is not to be executed at the first time;
   associating the second seglet with a pending list; and
   executing one or more commands associated with the first seglet at the first time.

12. The computer-implemented method of claim 6, wherein the first seglet includes a first set of commands spanning from a start of the first command buffer segment to a command immediately before the synchronization command, and wherein the second seglet includes a second set of commands spanning from the synchronization command to an end of the first command buffer segment or another synchronization command.

13. The computer-implemented method of claim 6, further comprising delaying an execution of the second seglet until a time in which the precondition associated with the synchronization command is satisfied.

14. A system comprising:
   one or more processors; and
   memory storing instructions that, when executed by the one or more processors, cause the system to perform operations comprising:
      receiving an indication to capture an operation associated with a graphics processing unit (GPU), the GPU comprising a graphics engine, a memory access engine, and a compute engine;
      capturing a first command buffer segment to be executed by the graphics engine;
      capturing a second command buffer segment to be executed by the memory access engine;
      capturing a third command buffer segment to be executed by the compute engine;
      identifying at least one command in the first command buffer segment associated with an execution precondition;
      identifying a signal command in the second command buffer segment or in the third command buffer segment, the signal command indicating that the execution precondition is satisfied;
      based at least in part on the at least one command and the signal command, segmenting the first command buffer segment into a first seglet and a second seglet, wherein the first seglet is a first atomic sequence of commands and the second seglet is a second atomic sequence of commands;
      determining at least one memory requirement for the first seglet or the second seglet at a time of executing the first seglet or the second seglet;
      capturing at least a portion of memory associated with the at least one memory requirement at the time of executing the first seglet or the second seglet; and
      generating a playback file including at least the first seglet, the at least the portion of memory associated with the at least one memory requirement, and the second seglet.

15. The system as recited in claim 14, the operations further comprising:
   transmitting, over a network, the playback file to a service provider.

16. The system as recited in claim 14, wherein the time of executing the first seglet or the second seglet is a first time of executing the first seglet wherein the at least one memory requirement is a first memory requirement associated with the first seglet, and wherein the at least the portion of memory is a first portion of memory associated with the first seglet, the operations further comprising:
   determining a second memory requirement for the second seglet at a time of executing the second seglet;
   determining that at least a subset of memory associated with the first memory requirement corresponds to the second memory requirement; and
   capturing at least a second portion of memory at the time of executing the second seglet, the at least the second portion of memory not including the at least the subset of memory associated with the first memory requirement.

17. The system as recited in claim 14, wherein the first command buffer segment and the second command buffer segment are associated with a same frame to be displayed.

18. The system as recited in claim 14, wherein the first seglet includes a first set of commands spanning from a start of the first command buffer segment to a command immediately before the at least one command associated with the execution precondition, and wherein the second seglet includes a second set of commands spanning from the first command associated with the execution precondition to an end of the first command buffer segment or another command associated with another execution precondition.

19. The system as recited in claim 14, the operations further comprising delaying an execution of the second seglet until a time in which the execution precondition associated with the at least one command is satisfied.

* * * * *